(12) United States Patent
Enderlein et al.

(10) Patent No.: US 7,310,515 B2
(45) Date of Patent: Dec. 18, 2007

(54) METHOD FOR ANONYMOUS IDENTIFICATION OF THE PROFILES OF SUBSCRIBERS IN A COMMUNICATION SYSTEM AND CORRESPONDING MODULE

(75) Inventors: Janos-Gerold Enderlein, Berlin (DE); Volker Klassen, Büdlich (DE); Wilfried Riemann, Ebersbach (DE)

(73) Assignee: Siemens Aktiengesellschaft, Munich (DE)

( * ) Notice: Subject to any disclaimer, the term of this patent is extended or adjusted under 35 U.S.C. 154(b) by 13 days.

(21) Appl. No.: 10/501,595

(22) PCT Filed: Jul. 1, 2003

(86) PCT No.: PCT/DE03/00067

§ 371 (c)(1),
(2), (4) Date: Jul. 12, 2004

(87) PCT Pub. No.: WO03/058906

PCT Pub. Date: Jul. 17, 2003

(65) Prior Publication Data

US 2005/0076124 A1    Apr. 7, 2005

(30) Foreign Application Priority Data

Jan. 11, 2002   (DE) ............................... 102 01 248

(51) Int. Cl.
*H04Q 7/20* (2006.01)
(52) U.S. Cl. ............................... 455/414.1; 455/432.3; 455/450
(58) Field of Classification Search ...... 455/41.2–41.3, 455/414.1–414.3, 456.3, 459, 517–518, 519, 455/552.1–553.1, 450, 451, 452.2, 432.3; 340/539.23
See application file for complete search history.

(56) References Cited

U.S. PATENT DOCUMENTS 5,590,184 A * 12/1996 London ................. 379/142.09

(Continued)

FOREIGN PATENT DOCUMENTS

DE       39 22 677       1/1991

(Continued)

OTHER PUBLICATIONS

XP 000822905—Kropat M: "Mobile Dating" Technik Report, vol. 2, No. 3, Apr. 1999 pp. 122-124.

(Continued)

*Primary Examiner*—Jean Gelin
(74) *Attorney, Agent, or Firm*—Bell, Boyd & Lloyd LLP

(57) ABSTRACT

Methods and apparatus for anonymous identification of the profiles of subscribers in a communication system, wherein subscribers define and store subscriber-specific profiles via a respective input unit in a respective communication terminal and/or in a respective module respectively coupled to a respective communication terminal. Each respective module communication terminal is used to collect the profiles of other subscribers of the communication system on the basis of a wireless, locally defined network technology which are compared to the profiles defined and stored in the respective communication terminal whereupon they are discarded according to a subscriber-specific correlation threshold or communicated to the respective subscriber. A communication link is set up by an intermediate coupled provider of the communication system between subscribers when the respective subscriber activation occurs. A module is also disclosed that can be integrated in a mobile communication terminal or on a mobile communication terminal via an interface. The module includes a memory unit for storing profiles, a collector unit functioning on the basis of a wireless, locally defined network technology for collecting (scanning) profiles of subscribers, a correlation unit for comparing profiles, and a signaling/synchronizing unit.

11 Claims, 1 Drawing Sheet

U.S. PATENT DOCUMENTS

| | | | |
|---|---|---|---|
| 5,872,850 A | 2/1999 | Metral et al. | |
| 6,134,432 A * | 10/2000 | Holmes et al. | 455/412.1 |
| 6,690,918 B2 * | 2/2004 | Evans et al. | 455/41.2 |
| 2001/0014911 A1 | 8/2001 | Doi et al. | |
| 2004/0203363 A1 * | 10/2004 | Carlton et al. | 455/414.1 |

FOREIGN PATENT DOCUMENTS

| | | |
|---|---|---|
| JP | 2001224055 | 8/2001 |
| WO | 3922677 | 1/1991 |
| WO | WO00/22860 | 4/2000 |
| WO | WO 00/22860 | 4/2000 |
| WO | WO01/24551 | 4/2001 |
| WO | WO 01/24551 | 4/2001 |
| WO | WO 01/97543 | 12/2001 |
| WO | WO01/97543 | 12/2001 |

OTHER PUBLICATIONS

"Mobile Dating", Siemens Technik Report, Jg. 2, Nr. 3 Apr. 1999, pp. 122-124.

T. Suda et al. "Adaptive Type Network Architecture for Creation of Services", Electronics, Information and Communication Engineers, Academic Journal, Mar. 2001, J84-B No. 3, pp. 310-320.

* cited by examiner

METHOD FOR ANONYMOUS IDENTIFICATION OF THE PROFILES OF SUBSCRIBERS IN A COMMUNICATION SYSTEM AND CORRESPONDING MODULE

BACKGROUND

The present disclosure relates to methods and apparatus for anonymous identification of profiles of subscribers in a communications system, such as a wireless communications system. When searching for specific offer and demand profiles, it is often desirable, on the one hand, to be able to make an anonymous selection from various profiles that are available for selection before making direct contact with a subscriber with a specific profile, but also, on the other hand, at the same time to have the capability to make immediate personal contact with a corresponding subscriber. Until now, typically an offer or a demand is produced by means of conventional media such as print (advertisement), the Internet (for example by Webpage), mobile radio technologies, such as by means of questionnaires from providers, for example. This offer was then either compared manually, in partially automated form or fully automatically with already stored offers and demands. This refers, for example, to the cognitive comparison of advertisements with the desired profile of the person carrying out the search, the use of search engines for searching the Internet, and the use of search robots. Until now, it has not been possible to make direct immediate contact with a specific subscriber in conjunction with an anonymous previous selection.

SUMMARY

The presently disclosed methods and apparatus make it possible for a subscriber in a communications system to easily, quickly and anonymously, identify, offer and demand profiles of other subscribers in the communications system, and, if required, to make contact with one or more subscribers immediately.

According to one example, a method is provided for anonymous identification of profiles of subscribers in a communications system. The method includes defining subscriber-specific profiles via an input unit of a communication appliance and then storing the subscriber-specific profiles in either the communication appliance or a module that is coupled to the communication appliance. Profiles of other subscribers in the communication system are collected through the module coupled to the communication appliance using wireless, locally restricted network technology. The collected profiles are then compared with the profile definements stores in either the communication appliance or the module. The profile is then either rejected or signaled to another subscriber based on a comparison with a subscriber-specific correlation threshold. A communication connection is then established between subscribers via an intermediate provider in the communication system whenever subscriber activation takes place.

In another example, an apparatus is provided, the apparatus including the module configured to at least one of integrate in a mobile communication appliance or coupled by via an interface to the mobile communication client. The module includes a memory unit for storage of profiles, a collecting unit that operates using wireless, locally limited network technology and is configured to collect profiles of subscribers in a communications system. The module also includes a correlation unit configured to compare the collected profiles with one another and a signaling/synchronization unit.

In this case, by way of example, the input unit may be a keyboard or keypad of a mobile communication appliance, such as a mobile telephone, or a keyboard of a computer unit, such as a personal computer (PC). A further possibility is to input the profile on an external appliance, such as on a personal computer (PC) and to transmit the data to the communication appliance via a wireless interface, in general via a radio interface or an infrared interface.

The module, which is coupled to a communication appliance, may be integrated in the communication appliance and may, thus, be a component of the communication appliance, or may be connected as an external module to the communication appliance in the form of a so-called plug-on module.

In one example, LAN (local area network) and/or PAN (personal area network) technology is used as the wireless, locally limited network technology. As an example, Bluetooth technology may be used in this case. The expression "Bluetooth" was introduced in a 1998 Specification by a Special Interest Group comprising experts from various companies, for a local data radio system. A transmission capacity of up to about 1 Mbit/s is offered to the subscribers in the communications system in a 2.4 GHz frequency band (ISM band), for which no licenses are required. The range is less than 100 m, and it is, thus, designed primarily for communication in a local area. Bluetooth technology is particularly suitable for the purposes of the presently disclosed methods and apparatus, for the reasons stated in the following text:

1. Bluetooth technology has been standardized throughout the world, it costs little, and represents a mass-produced product,
2. Bluetooth technology can easily be integrated in communication appliances using a cellular mobile radio standard, such as GSM, GPRS, EDGE, UMTS,
3. Low costs are incurred for use of a radio channel,
4. The range is deliberately restricted so as to make contact only with the appliances in the immediate vicinity.

IEEE 802.11b LAN technology can be used as an alternative to Bluetooth. Further wireless technologies for Local and Personal Area Network applications are currently in the standardization phase and could also be used.

The technology that is used is coupled to a mobile communication appliance (referred to in the following text as a cellular communication appliance), which operates in accordance with a cellular standard. As an example, a mobile communication appliance based on the GSM, GPRS, EDGE and/or UMTS standard may be used.

For anonymous identification of matching offer and demand profiles in the immediate vicinity of the searching subscriber in the communications system, the searching subscriber uses, for example, a categorization and description rule to, for example, define an object offer, demand or interest profile, and advantageously store this in a suitable form in the module or communication appliance. By way of example, the nature of the offer or demand object or area of interest is described using the standardized categorization rule, and the object is itself described using the standardized, object-typical description rule. The definition of standardized rules provides the capability for successful correlations.

The module that is being used automatically makes use of a wireless, locally limited network technology on an ad hoc basis to contact every other module that is located in the same radio cell as the searching subscriber himself. A direct, bidirectional connection is thus set up. After the identification of a further module in the corresponding radio cell of the subscriber, an ad hoc connection is set up to this module, and the profiles of the corresponding subscribers are then transmitted bidirectionally to the searching subscriber. After reception of the data, the profiles are correlated in both modules that are involved.

In one example of the presently disclosed method, each module of a subscriber is allocated an ID number. The so-called Bluetooth device address, which is supported by the Bluetooth Standard, is automatically used as the ID number, and uniquely identifies every Bluetooth module throughout the world. By way of example, once the systems have first been switched on, the modules transmit their ID numbers via the cellular communication appliances to the intermediate provider. The provider then sets up a unique association between the ID number of the module and the address (telephone number) of the cellular communication appliance. This association is only valid provided that the module is not replaced. If a different module is connected to the communication appliance, the provider must carry out a new allocation process. The method mentioned above may be used for this purpose. The ID numbers are likewise transmitted bidirectionally, in order to identify the corresponding modules, while making contact between two respective modules.

A correlation threshold, which is defined in advance by the corresponding subscriber, decides on the basis of the correlation process whether two profiles should be assessed as matching sufficiently well. If this is the case, then the subscriber is informed in some suitable form (e.g., acoustically) of a positive correlation result. The information states that a partner or object of interest in terms of the offer and demand is located in the immediate vicinity. When using Bluetooth technology, this distance is generally less than 100 m.

For the purposes of the disclosed methods and apparatus, the following criteria are important to make personal contact with the subscribers, (i.e., to set up a direct communication connection). The network technology used means that it cannot and should not be assumed that there is any direct visual link, which would simplify the contact. Furthermore, owing to the desire for discretion, it is not essential to have to set up and identify a direct personal (visual) link. Additionally, it must not be essential to have to set up the link immediately in time. It must also be possible to avoid personal details becoming known, such as a telephone number or address, in order to make direct contact. Finally, the subscriber has full flexibility to accept or reject a personal contact, with complete protection of his intimate environment.

If a direct communication connection is intended to be set up, this is done by a respective suitable activation process at the subscriber end. Such activation may be carried out, for example, by pushing a key on the module or on the communication appliance input unit. A communication connection, such as a GSM, GPRS, EDGE or UMTS connection, is first set up automatically to an intermediate provider in the communications system. This intermediate provider organizes the contact. By way of example, the contact may be organized as follows. A module of a subscriber A transmits an ID number of a module of a subscriber B whom the subscriber A wishes to contact, with a contact request via the cellular communication appliance to the intermediate provider. The subscriber B and the associated module can be identified uniquely by this ID number, which is stored with the provider. The provider checks whether the module of the subscriber B or the subscriber B with which or whom subscriber A wishes to make contact, likewise in the framework of a time window to be defined, has notified any interest in making contact, once the ID number has likewise been transmitted to him or it together with a contact request. If this is not the case, then direct contact is impossible. Furthermore, in the case of an unsuccessful direct contact, the provider can bill the subscriber A with a fee, depending on the tariff regulations.

If the subscriber B is likewise interested in making contact, then the subscriber B or the module of the subscriber B transmits the ID number of A together with a contact request, likewise via the cellular communication appliance, to the provider. If both contact requests and the ID numbers of the modules occur within a defined time window, then the contact is successful. A neutral telephone number is in each case preferably assigned to the subscribers in order to set up a communication connection between the subscribers A and B. This provides the capability for both subscribers to make contact via neutral telephone numbers, which are not the same as the personal telephone numbers, in order to protect anonymity. The neutral telephone numbers are preferably assigned temporarily for a specific time window. By way of example, the provider may charge the subscribers A and B a fee for each successful contact, for example in the order of magnitude of a present-day SMS (short message service) transmission. Contact is thus successfully made. The subscribers A and B may now have a verbal discussion. Since the two subscribers are close to one another, immediate personal contact is also possible.

In another example, one of the subscribers may be a stationary or mobile provider of a product or of a service. On the basis of the given description, the offer or the demand is communicated by means of the described technology to each subscriber passing by within a limited area. On the basis of the known terminology, this service may be referred to as a location based offer or location based services. In addition to information on the precisely described location, the provider of the service may (on confirmation of the interest by a potential customer) advantageously be sent further information, such as prices, via the communication appliance. In contrast to the above application, the service provider automatically confirms the correlation.

One feature of the present disclosed systems over already existing identification systems as mentioned initially is, inter alia, that a searching subscriber and a providing subscriber are located in the immediate vicinity of one another, so that it is possible for the two subscribers to make personal contact, possibly directly and spontaneously, if both are interested in so doing. If, for example, one subscriber is looking for a tennis partner in his immediate vicinity with whom he also would now like to play a game of tennis, then the method according to the invention makes it possible for him to find out whether an appropriate tennis partner for him is located in his vicinity. If this is the case, that is to say a match can be found between an offer and a demand, then each of the two subscribers has reaction options, depending on the situation. A communication connection is set up only if both subscribers notify interest in making contact by subscriber-end activation. The two subscribers can thus contact one another spontaneously, easily and quickly. Until direct personal contact is made, the intimate environment is protected by not issuing the personal contact information, such as the telephone number and/or address. This is particularly important when using the disclosed method when searching for friends and/or partners.

The present disclosure method also features that the process of searching for a matching profile in the immediate vicinity is carried out locally and continuously over time without the corresponding subscriber having to carry out any action repeatedly. This means that the search is carried out in parallel with another business activity. Furthermore, as already mentioned, the search is discreet and anonymous. It is not binding, and can be controlled on a personal basis.

The presently disclosed method also features module that can be integrated in a mobile communication appliance and/or can be coupled via an interface to a mobile communication appliance which has at least the following elements: a memory unit for storage of profiles; a collecting unit, which operates on the basis of a wireless, locally limited network technology, for collecting (scanning) profiles of subscribers in a communications system; a correlation unit for comparison of profiles with one another; and a signaling/synchronization unit.

The components of the module described above may also become components of the communication appliance, as the degree of integration increases. Thus, for example, the memory unit may be integrated in the memory of the communication appliance, the function of the correlation unit may be carried out by the processor of the communication appliance, and the function of the signaling and synchronization unit may be carried out by additional hardware in the communication appliance. One characteristic feature of the module that is fully integrated in the communication appliance is the LAN/PAN technology and the specific software for controlling the additional functionality.

The mobile communication appliance supports cellular communication standards, such as GSM, GPRS, EDGE or UMTS. The most important components of the communication appliance are the mobile radio hardware and software, with an interface for the module and for the input unit. The collecting unit may be a unit that operates on the basis of LAN and/or PAN technology. Furthermore, the memory unit may be a RAM. The correlation unit may include a microcomputer. Furthermore, the signaling/synchronization unit may be a software-assisted circuit.

DETAILED DESCRIPTION OF THE PRESENT EXAMPLES

Figure 1:
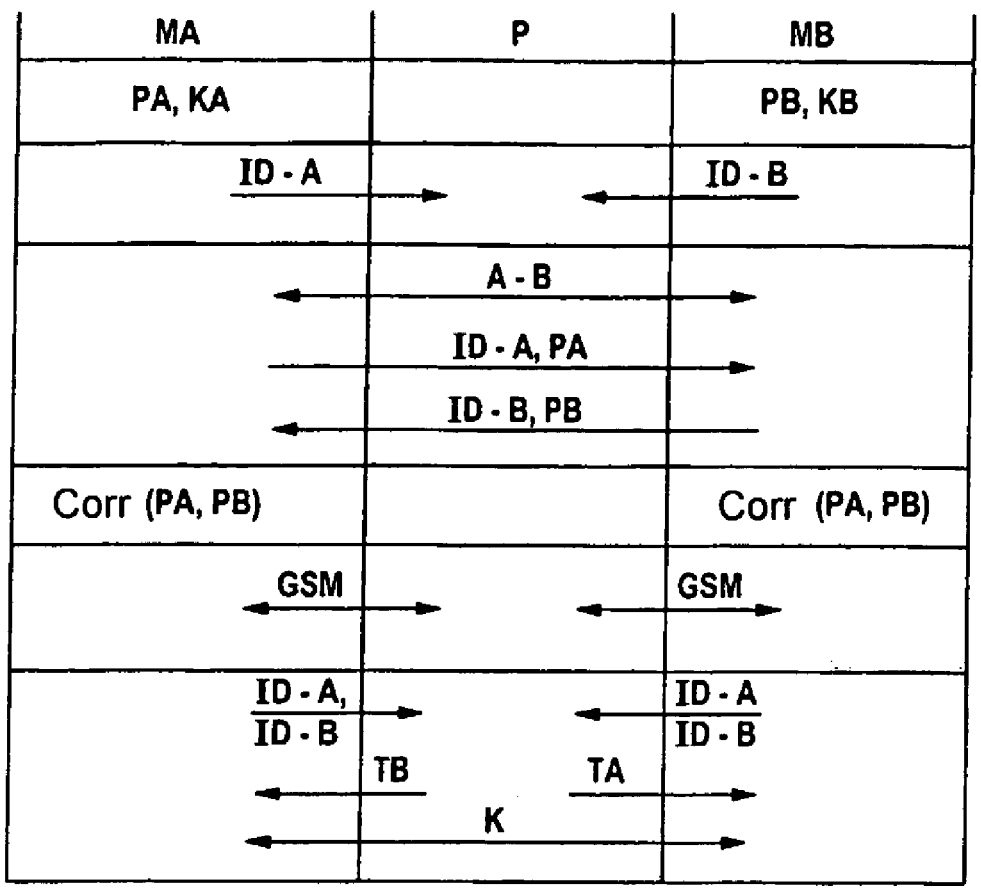
FIG. 1 illustrates a schematic flowchart of one example of the disclosed method.

As is illustrated in the flowchart of FIG. 1, in order for a subscriber A to search for and identify a profile PA within a communications system, the subscriber A first of all enters in a module MA the profile PA defined and sought by him, and at the same time defines a correlation threshold KA. This correlation threshold KA determines the degree of match that should be present in the comparison of profiles of other subscribers with the profile PA of the subscriber A so that subscriber A will include the correspondingly different profile of another subscriber in a narrower selection. Another subscriber B in the communications system enters a profile PB which is defined and sought by him in a module MB and defines a correlation threshold KB. The ID numbers of the module MA of the subscriber A, referred to in the following text as "ID-A" and of the module MB of the subscriber B, referred to as "ID-B" in the following text, are transmitted to a provider P, where they are stored. The provider P thus has a unique association between the telephone number of the subscriber A and the ID number ID-A of MA, and the telephone number of the subscriber B and the ID number ID-B of MB.

By means of connections that are in each case set up to other modules of other subscribers, the module MA uses LAN or PAN technology to collect profiles of other subscribers in the immediate vicinity in the communications system. The module MB carries out the same procedure. In this case, inter alia, a connection A-B is also set up from the module MA to the module MB. The module MA sends the profile PA together with the ID number ID-A to the module MB, which receives the data. In the same way, the module MB sends the profile PB together with the corresponding ID number ID-B to the module MA. A correlation Corr of the two profiles PA and PB is in each case carried out, both in the module MA and in the module MB. If the respective correlation threshold KA or KB is reached in both modules, then both the subscriber A and the subscriber B have the capability to carry out appropriate activation, such as by pushing a button on the input unit of his module or the communication appliance, for example, in order to express the wish to set up a communication connection. A GSM connection is then set up automatically to the communications system provider. If both subscribers express the wish for a communication connection within a fixed time window, then the provider allocates a temporary telephone number TB from the subscriber B to the subscriber A, and a temporary telephone number TA from the subscriber A to the subscriber B. These telephone numbers are allocated appropriately to the subscribers, such that the subscribers A and B can each make contact K with one another via these telephone numbers.

Figure 2:
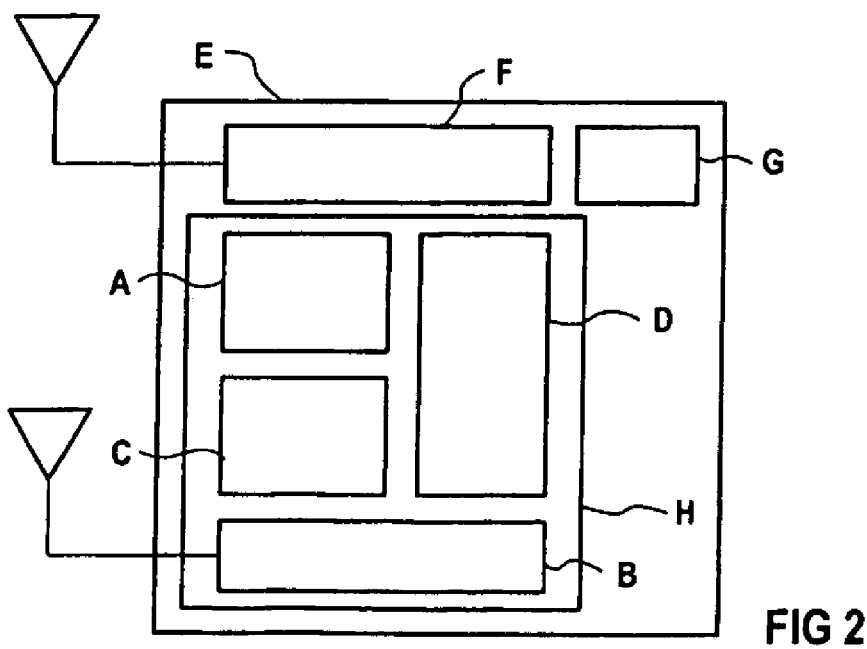
FIG. 2 illustrates a schematic illustration of an exemplary module according to the present disclosure, which is integrated in a mobile communication appliance.

FIG. 2 shows a module H that is integrated in a mobile communication appliance E. The mobile communication appliance E includes the radio hardware F and the software with an interface for the module H and the input unit G. The module H also includes a memory unit A for storage of profiles, a collecting unit B, which operates on the basis of a wire-free, locally limited network technology, for collecting (scanning) profiles of subscribers in a communications system, a correlation unit C for comparison of profiles with one another, and a signaling/synchronization unit D.

Although preferred examples of the present methods and apparatus have been disclosed for illustrative purposes, those of ordinary skill in the art will appreciate that the scope of this patent is not limited thereto. On the contrary, this patent covers all methods and apparatus falling within the scope of the appended claims.

The invention claimed is:

1. A method for anonymous identification of profiles of subscribers in a communications system comprising:
  defining subscriber-specific profiles via an input unit of a communication appliance and storing the subscriber-specific profiles in at least one of the communication appliance and a module that is coupled to the communication appliance, wherein the subscriber specific profile comprises an ID number;
  collecting a profile of another subscriber in the communications system through the module coupled to the communication appliance using wireless, locally restricted network technology, wherein the other subscriber profile comprises an ID number;
  comparing the collected profile with the profile defined and stored in one of the communication appliance and module, wherein the profile is one of rejected or signaled to another subscriber based on comparison with a subscriber specific correlation threshold; and establishing a communication connection between the subscribers via an intermediate provider in the communications system whenever subscriber end activation takes place, wherein the step of establishing a communication connection comprises (1) setting up a communication link between the subscriber and the intermediate provider, (2) signaling the stored ID numbers of the subscriber and the other subscriber to the intermediate provider, (3) setting up a communication link between the other subscriber and the intermediate provider, (4) signaling the stored ID numbers of the other subscriber and the subscriber to the intermediate provider, wherein the intermediate provider allocates a first neutral telephone number to the subscriber and allocates a second neutral telephone number to the other subscriber, and makes the each neutral telephone number available to the other subscriber, wherein a communication link is set up between the subscribers via the intermediate provider.

2. The method as claimed in claim 1, wherein the wireless, locally limited network technology is one of a local area network (LAN) and a personal area network (PAN) utilizing Bluetooth technology.

3. The method as claimed in claim 1, wherein a respective mobile communication appliance, which operates in accordance with a standard, is used as the respective communication appliance, with the standard being selected from a group consisting of GSM, GPRS, EDGE and UMTS.

4. The method as claimed in claim 1, wherein each module of a subscriber is allocated an ID number.

5. The method as claimed in claim 1, wherein the input unit comprises a computer.

6. The method as claimed in claim 1, wherein the neutral telephone numbers are assigned temporarily.

7. A communication system, comprising:

a plurality of modules communicatively coupled to respective mobile communication appliances assigned to subscribers, each module comprising:

a memory unit for storage of profiles received from other subscribers, wherein each profile comprises an III) number;

a collecting unit that operates using wireless, locally limited network technology, and is configured to collect profiles of subscribers in a communications system;

a correlation unit configured to compare the collected profiles with one another;

a signaling/synchronization unit; and an intermediate provider, communicatively coupled to the module, wherein the intermediate provider establishes a communication connection to at least two subscribers by (1) setting up a cofrimunication link between a first subscriber and the intermediate provider, (2) signaling the stored ID numbers of the first subscriber and a second subscriber to the intermediate provider, (3) setting up a communication link between the second subscriber and the intermediate provider, (4) signaling the stored ID numbers of the second subscriber and the first subscriber to the intermediate provider, wherein the intermediate provider allocates a first neutral telephone number to the first subscriber and allocates a second neutral telephone number to the second subscriber, and makes each neutral telephone number available to the two subscribers, wherein a communication link is set up between the two subscribers via the intermediate provider.

8. The apparatus as claimed in claim 7, wherein the collecting unit is configured to operate on the basis of at least one of local area network (LAN) and personal area network (PAN) technologies.

9. The apparatus as claimed in claim 7, wherein the memory unit comprises a RAM.

10. The apparatus as claimed in claim 7, wherein the correlation unit comprises a microcomputer.

11. The apparatus as claimed in claim 7, wherein the signaling/synchronization unit comprises a software assisted circuit.

* * * * *